United States Patent Office 2,890,329
Patented June 9, 1959

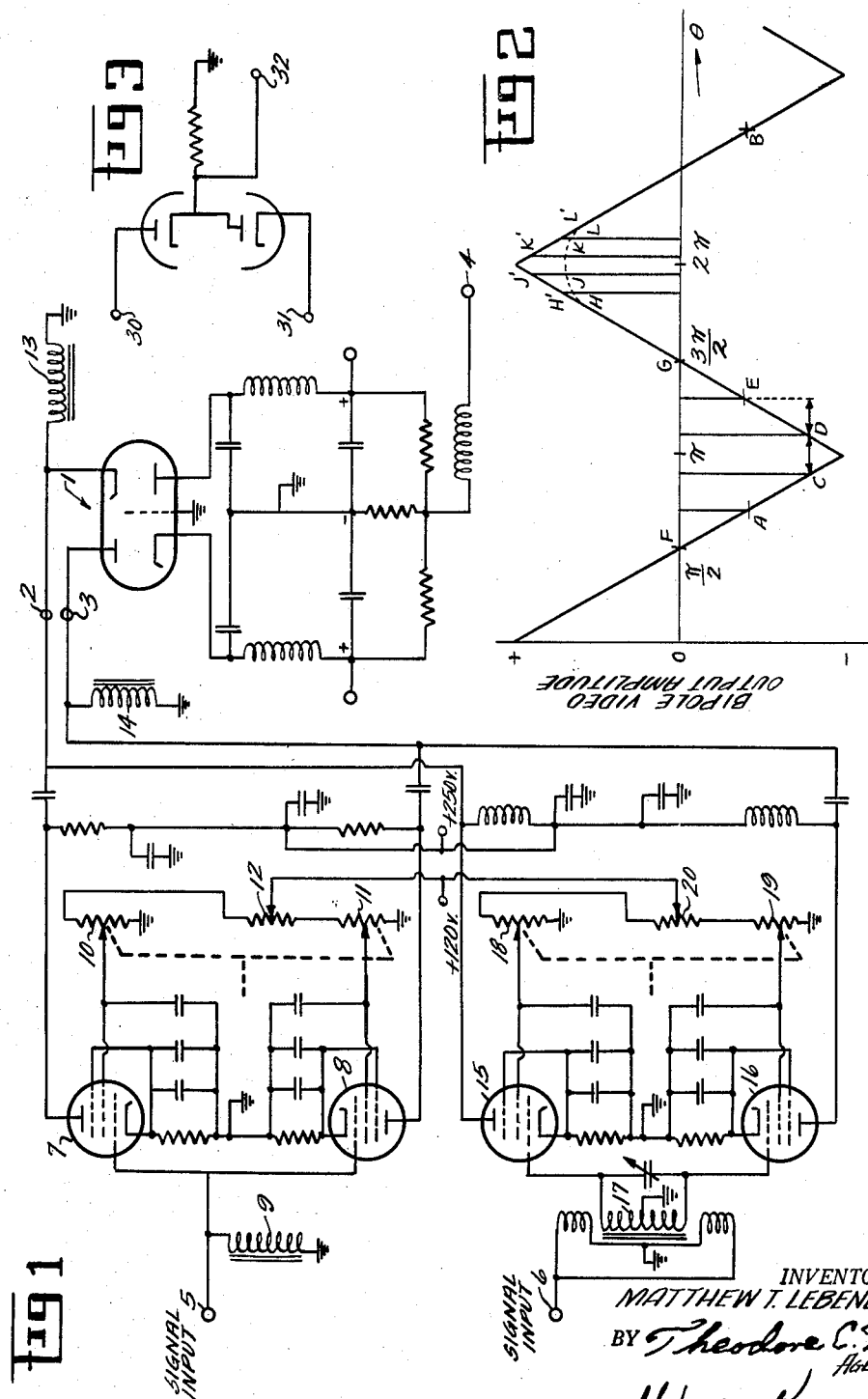

2,890,329

PHASE DETECTOR CIRCUIT

Matthew T. Lebenbaum, Garden City, N.Y., assignor to the United States of America as represented by the Secretary of the Air Force Application February 1, 1952, Serial No. 269,563

1 Claim. (Cl. 250—27)

This invention relates to phase detecting systems and more particularly to the type of phase detector circuit known as the double-diode type.

One of the objects of this invention is to provide a double-diode phase detector circuit wherein the necessary adjustments may be made in a simple yet efficient manner.

Another object of this invention is to provide a double-diode phase detector circuit which will be very sensitive to small differences in phase of the signals to be compared.

The above objects as well as other objects, features and advantages of this invention will be more clearly understood in view of the following description when taken in conjunction with the drawings wherein:

Fig. 1 is a schematic diagram of a circuit embodying this invention.

Fig. 2 is a graph illustrating the characteristic of a double-diode type phase detector.

Fig. 3 is a simplified schematic diagram of a double-diode type phase detector.

Referring now to the drawings and more particularly to Fig. 2 thereof which shows an expanded section of a double-diode type phase detector characteristic. The solid lines of the graph represent the ideal case and the dotted lines shown exaggerate rounding of the nose of the characteristic encountered in practical circuits.

In the art of radar systems employing moving target indicator receivers it is essential that the rounding of the nose of the phase indicator characteristic be as small as possible. An examination of a number of cases of targets with varying velocities at various initial phases on the characteristic will show how fading and blind speeds may arise. (Blind speeds are defined as those speeds at which the target may travel and appear to the observer as a fixed target.) (Fading occurs when some of the target returns are either reduced in amplitude or are equal to zero.) The first true blind speed occurs when the target travels a distance equal to one-half-wave length of the transmitter frequency between pulses. This case results in a difference in phase between sucessive returns equal to $2\pi$ radius, points A and B in Fig. 2 represents the output from the phase detector on two successive target returns for an object moving at this speed. Because a moving target is indicated by taking the difference in amplitude between the phase detector output on successive signal returns and because this moving target signal has equal outputs on successive returns, the signal from this moving target will be canceled exactly as though it were a signal from a fixed target. It is also true that a target moving at any multiple of this speed will also produce no output. Furthermore, targets that have no radial component of velocity with respect to the radar will have zero phase change and will therefore not be detected as a moving target. A blind speed may also occur at a velocity equal to one-half of the first blind speed if the position of the moving target is such that its phase falls at point F. The next return will be at point G and so on and no output will be indicated. This type of blind speed however occurs very seldom.

It a target is traveling at such velocity that it progresses from C to D on the phase-detector characteristic in one pulse period, it may be seen that there will be no resultant output when these two returns are compared, but the next return that occurs at E will give an output when compared with D. This case then results in missing occasional returns which will cause fading of varying degrees of severity, depending upon particular velocities and positions.

It is now evident why a sharp nose on the phase detector characteristic is essential to the reduction of fading. For example, points H, J, K and L represent successive returns from a round-nosed characteristic. The difference between the successive amplitudes are quite small, and it may be very difficult to obtain a satisfactory video signal from such a characteristic. If a sharp corner (such as that shown on the ideal characteristic in solid lines) had been produced, the difference between the successive amplitudes would have been considerably greater.

Fig. 3 is a simplified circuit of a double-diode phase detector having input terminals 30 and 31 and output terminal 32. When this circuit is used to compare the phase of two signals, the first signal is applied directly to terminal 30 and directly to terminal 31, the second signal is applied directly to terminal 30 and is shifted in phase 180° and then applied to 31.

The five requisites for good operation of this type of phase detector are:

(1) The first signal shall be applied to input terminals 30 and 31 in phase.

(2) The second signal shall be applied to terminal 30 and shall be applied to terminal 31 180° out of phase.

(3) The first signal applied to terminal 30 shall be equal in amplitude to the first signal applied to terminal 31.

(4) The second signal applied to terminal 30 shall be equal in amplitude to the second signal applied to terminal 31.

(5) The amplitude of the first signals shall be equal to the amplitude of the second signals.

If any one or more of the above five requisites are not maintained, the phase detector will have a rounded-nose characteristic as above described.

There have been previously suggested other circuits for energizing double-diode phase detectors, for example, the circuits illustrated and described on pages 596 to 601 of the "Microwave Receiver" by Van Voorhis, Radiation Laboratory Series, volume 23, first edition. However such circuits were difficult to properly adjust to obtain the above mentioned requisites.

Referring now to Fig. 1, in accordance with this invention a double-diode phase detector 1 having input terminals 2 and 3 and output terminal 4 produces an output whose amplitude is proportional to the phase difference between the signal applied to signal input terminal 5 and the signal applied to signal input terminal 6.

A signal from terminal 5 is applied to the control grid of tube 7 and the control grid of tube 8. Inductance 9 is used to tune out the input capacitance of the two tubes and the capacitance of the conductors connecting the input terminal 5 to the grids of tubes 7 and 8. Tubes 7 and 8 are conventional pentode amplifiers whose gains can be controlled by a variable screen voltage, derived from ganged potentiometers 10 and 11. The gains of tubes 7 and 8 can be made equal by means of the potentiometer 12. The plate of tube 7 is connected to the input terminal 2 of the double-diode detector 1 and the plate of tube 8 is connected to the input terminal 3 of double-diode detector 1. Inductances 13 and 14 are single-tuned circuits in the plate circuits of tubes 7 and 8 respectively.

A signal from input terminal 6 is applied to the control grid of tube 15 and to the control grid of tube 16 through a single-ended to push-pull transformer 17 which in turn is connected in such a manner that the grids of tubes 15 and 16 are fed 180° out of phase. Tubes 15 and 16 have essentially the same circuits as tubes 7 and 8 except for the grid connection. The plate of tube 15 is connected to input terminal 2 of the double-diode detector 1 and the plate of tube 16 is connected to the input terminal 3 of the double-diode detector 1.

From the above circuits it will be apparent that a signal applied to terminal 5 will produce a signal at the input terminal 2 of the double-diode detector 1 which is in phase with the signal applied to terminal 3. The amplitude of those two signals can be easily made equal by a simple adjustment of the potentiometer 12. The signal applied to input terminal 6 will be applied to the input terminals 2 and 3 of the double-diode detector 1 180° out of phase with each other and the amplitude of those two signals can be made equal by simple adjustment of the ganged potentiometer 20. The amplitude of the two signals produced at the plate circuits of tubes 7 and 8 may be made equal to the amplitude of the two signals at the plates of tubes 15 and 16 by a simple adjustment of the ganged potentiometers 10 and 11 or the ganged potentiometers 18 and 19.

It will thus be apparent from the above description that the previously enumerated five requisites for good operation of a double-diode phase detector have been provided since simple adjustments can be made to produce the required conditions.

When applied to a moving target indicator receiver, the equipment of this invention will usually have the IF signal applied to input terminal 5 and the COHO signal applied to input terminal 6. In that type of receiver, the output terminal 4 of the phase detector will usually be applied to a cathode follower circuit.

What is claimed is:

A phase detector circuit comprising a first input circuit and a second input circuit to which signals to be compared in phase are applied; first, second, third and fourth amplifier tubes each having an anode, a cathode, a control grid and an auxiliary grid capable of varying the amplification of the tube through variation of the auxiliary grid voltage; means for applying the signal in said first input circuit between the control grids and cathodes of said first and second tubes in equal amplitude and phase; means for applying the signal in said second input circuit between the control grids and cathodes of said third and fourth tubes in equal amplitude and opposite phase; means for vectorily adding the signals on the anodes of said first and third tubes and for producing a direct voltage proportional to the amplitude of the resultant; means for vectorily adding the signals on the anodes of said second and fourth tubes and for producing a direct voltage proportional to the amplitude of the resultant; means for producing a voltage proportional to the difference in said direct voltages; first, second, third and fourth nominally identical adjustable potentiometers having their adjustable taps connected to the auxiliary grids of said first, second, third and fourth tubes, respectively; ganging means between the taps of said first and second potentiometers for maintaining equal voltage division thereby and to permit simultaneous adjustment thereof; ganging means between the taps of said third and fourth potentiometers for maintaining equal voltage division thereby and to permit simultaneous adjustment thereof; a source of direct voltage; means connecting the low potential ends of said potentiometers to the low potential terminal of said source; a resistor having an adjustable tap connected between the high potential ends of said first and second potentiometers; a resistor having an adjustable tap connected between the high potential ends of said third and fourth potentiometers; and means for connecting the taps on said resistors to the high potential terminal of said direct voltage source.

References Cited in the file of this patent

UNITED STATES PATENTS

| | | |
|---|---|---|
| 1,931,648 | Dyksterhius | Oct. 24, 1933 |
| 1,948,303 | Lavoie | Feb. 820, 1934 |
| 2,243,214 | Krauth | May 27, 1941 |
| 2,314,851 | Barney et al. | Mar. 23, 1943 |
| 2,429,788 | Atwood | Oct. 28, 1947 |
| 2,463,652 | Storm | Mar. 8, 1949 |
| 2,467,361 | Blewett | Apr. 12, 1949 |